United States Patent [19]

Cain et al.

[11] Patent Number: 5,451,422

[45] Date of Patent: * Sep. 19, 1995

[54] EDIBLE PLASTIFIED DISPERSION

[75] Inventors: Frederick W. Cain, Voorburg, Netherlands; Jennifer I. Day, Bedford, Great Britain; Malcolm G. Jones, Stevington, Great Britain; Ian T. Norton, Rushden, Great Britain; Elizabeth Y. Salgado, Rushden, Great Britain

[73] Assignee: Lever Brothers Company, Division of Conopco, Inc., New York, N.Y.

[*] Notice: The portion of the term of this patent subsequent to Apr. 12, 2011 has been disclaimed.

[21] Appl. No.: 663,755

[22] Filed: Mar. 1, 1990

Related U.S. Application Data

[63] Continuation of Ser. No. 324,962, Mar. 16, 1989, abandoned, which is a continuation of Ser. No. 157,209, Feb. 17, 1988, abandoned.

[30] Foreign Application Priority Data

Feb. 18, 1987 [GB] United Kingdom .................. 8703761
Sep. 1, 1987 [GB] United Kingdom .................. 8720542

[51] Int. Cl.$^6$ ............................................. A23D 7/04
[52] U.S. Cl. .................................... 426/602; 426/573
[58] Field of Search ............... 426/603, 804, 573, 602, 426/604

[56] References Cited

U.S. PATENT DOCUMENTS

| 4,103,037 | 7/1978 | Bodor et al. | |
| 4,305,970 | 12/1981 | Moran et al. | |
| 4,389,426 | 6/1983 | Reissmann et al. | 426/603 |
| 4,536,408 | 8/1985 | Morehouse et al. | |
| 4,917,915 | 4/1990 | Cain et al. | 426/573 |
| 5,302,408 | 4/1994 | Cain | 426/603 |

FOREIGN PATENT DOCUMENTS

| 1127000 | 7/1982 | Canada . |
| 0011344 | 5/1980 | European Pat. Off. . |
| 0098664 | 1/1984 | European Pat. Off. . |
| 2035360 | 6/1980 | United Kingdom . |

*Primary Examiner*—Carolyn Paden
*Attorney, Agent, or Firm*—Gerard J. McGowan, Jr.

[57] ABSTRACT

The present invention is concerned with an edible plastified dispersion having a fat content of less than 30% by weight and comprising a continuous fat phase, which includes an aqueous phase that contains protein or hydrocolloid or a mixture thereof, wherein the composition constituting the aqueous phase has a viscosity of less than 400 cps at a temperature of 35° C. and a shear rate of 1000 s$^{-1}$, and wherein the content of amino acid residues is less than 200 ppm calculated on the weight of the aqueous phase.

10 Claims, No Drawings

EDIBLE PLASTIFIED DISPERSION

This is a continuation of application Ser. No. 324,962, filed Mar. 16, 1989, now abandoned; which in turn is a Rule 62 Continuation of Ser. No. 157,209, filed Feb. 17, 1988, now abandoned.

BACKGROUND OF THE INVENTION

The present invention relates to an edible plastified dispersion having a fat content of less than 30% by weight and comprising a continuous fat phase, which includes an aqueous phase that contains protein or hydrocolloid or a mixture thereof.

Edible, plastified fat-continuous dispersions (often called spreads) that can be used as replacement for butter or margarine, having a fat content below 80 wt. %, are well known. A wide variety of such products is commercially available. Most of these products have a fat content of about 40 wt. %. There is, however, need of spreads having a fat content of substantially less than 40 wt. %.

A spread should have a plastified continuous fat phase to give it suitable spreadability. It should not release moisture when it is being spread. Furthermore, a spread should be spreadable at refrigerator temperature, be stable at room temperature, but destabilize and release its flavour in the mouth. These goals are very difficult to achieve if only a small amount of fat is to be used to constitute a continuous phase.

In GB 2,035,360 a process is disclosed for the preparation of spreads containing 20 wt. % fat. According to this process, the aqueous phase is sprayed onto the fatty phase. During the addition of the sprayed aqueous phase, the emulsion is circulated through a static mixer to increase the viscosity. The final viscosity suitably is about 18000 cps (18000 mPa.s) at a shear rate of 13 sec.$^{-1}$ and 2700 cps (2700 mPa.s) at a shear rate of 134 sec.$^{-1}$ at 38° C. When this viscosity has been obtained, the emulsion is cooled and worked to cause crystallization of fat to occur. In practice, this process has not been successful. It is difficult to apply the process under factory conditions.

EP 0 011 344 describes the incorporation in fat-continuous spreads containing 18–82 wt. % fat phase, of a gelled aqueous phase having a softening point of at least 33° C., showing a sharp decrease in gel strength at a temperature ranging from 45° to 70° C. and a gel strength at a temperature below the softening point ranging from 0.1 to 30 N/cm$^2$. Spreads having a very low fat content, prepared with aqueous phase compositions as disclosed in EP 0 011 344 have been found to be unsatisfactory. In particular, such spreads tend to release water under spreading conditions.

U.S. Pat. No. 4,536,408 describes low-fat spreads comprising 15–35 wt. % fat and 15–35 wt. % of a nongelling starch hydrolysate having a DE (dextrose equivalent) of 4–25. The products are prepared by cooling and mixing the fat into an aqueous solution of the starch hydrolysate with a high-speed blender until phase inversion occurs. The products disclosed in U.S. Pat. No. 4,536,408 have been found to have a poor oral response. They do not break down sufficiently in the mouth and, consequently, they have a poor flavour release.

The process employed to produce the spreads according to U.S. Pat. No. 4,536,408 involves phase inversion of an oil-in-water emulsion containing a fat blend having a melting point above about 38° C., with a high-speed blender. Substantial problems would be encountered if one were to try to carry out such a process, requiring the application of very high shear forces, on a factory scale.

Another disadvantage of the products according to the proposal of U.S. Pat. No. 4,536,408 is that they contain a very substantial amount of carbohydrate. Although the fat content of the products is low, the reduction in calorific value by reducing the fat content is partially offset by incorporating the starch hydrolysate.

SUMMARY OF THE INVENTION

It has now been found that low-calorie spreads comprising protein and/or hydrocolloid that are stable at ambient temperature and under spreading conditions and that have favourable organoleptic properties compared with prior art products, can be prepared in an essentially conventional manner without having to use specially adapted sophisticated equipment, if such spreads comprise an aqueous phase having a relatively low viscosity and moreover contain less than 200 ppm of amino acid residues, calculated on the weight of the aqueous phase.

Accordingly, the present invention provides an edible plastified dispersion having a fat content of less than 30% by weight and comprising a continuous fat phase, which includes an aqueous phase that contains protein or hydrocolloid or a mixture thereof, wherein the composition constituting the aqueous phase has a viscosity of less than 400 cps (400 mPa.s) at a temperature of 35° C. and a shear rate of 1000 s$^{-1}$, and wherein the content of amino acid residues is less than 200 ppm calculated on the weight of the aqueous phase.

The low-calorie, edible plastified dispersions, described in the prior art, having a fat content of less than 30 wt. %, comprising a continuous fat phase, and having acceptable product properties, may be divided into two classes. The products of the first class comprise an aqueous phase essentially consisting of pure water, i.e. comprising no gelling and/or thickening agent. The aqueous phase as present in products of this kind, only comprises preservatives, vitamins, salt and flavour compounds. Many consumers, however, find such a product to be rather watery, and prefer products giving a more pronounced organoleptic impression. The producs of the other class disclosed in the prior art contain a thickened and/or gelled aqueous phase of high viscosity under high shear. Products comprising such a highly viscous aqueous phase appear to give a rather thick mouthfeel upon consumption.

The present products are superior to the products mentioned above in that they do not give a watery impression, and moreover do not give a thick mouthfeel, owing to the fact that they comprise an aqueous phase comprising a hydrocolloid and/or protein, which aqueous phase furthermore does not have a high viscosity. Up till now, acceptable products comprising an aqueous phase containing a hydrocolloid and/or protein, and having a relatively low viscosity, could not be prepared, or appeared to show deficiencies such as the release of water on spreading. We have found now that acceptable products of the latter type can be prepared, if the requirement is met that the amino acid residue content of the aqueous phase is very low, i.e. lower than 200 ppm, calculated on the weight of the aqueous phase.

Although Applicant does not wish to be bound by theory, it is believed that unless the aqueous phase does have a high viscosity, due to the presence of large amounts of thickening and/or gelling agent, the presence of amino acid residues in amounts exceeding 200 ppm will lead to stability problems, in that either these products cannot be prepared or, if they can be prepared, they have a poor spreading behaviour and/or lose water on spreading. As the presence of amino acid residues at concentration levels as low as 100–200 ppm may still have an adverse effect on the product properties, e.g. the spreadability, the content of amino acid residues in the present dispersion is preferably less than 150 ppm, more preferably less than 100 ppm, as such a product combines a good stability with good product properties.

It has been found that the viscosity of the aqueous phase, at a temperature of 35° C. and a shear rate of 1000 sec.$^{-1}$, is a good measure for the thickness of the products according to the invention, as perceived in the mouth. The present dispersion does not give a thick mouthfeel, and accordingly the aqueous phase, as present in the dispersion according to the invention, has a viscosity at 35° C. and a shear rate of 1000 sec.$-1$ of less than 400 mPa.s.

Although at first sight it might appear that when using, for example, starch hydrolysis product or locust bean gum in the aqueous phase composition, the problems encountered could not be ascribed to the presence of amino acid residues, we have found that this nevertheless is the case. Even though such hydrocolloids consist predominantly of polysaccharides, they do contain as minor component some amino acid residues, whether in the form of protein or otherwise. Polysaccharide hydrocolloids generally do not contain a very high amount of amino acid residues as contaminant. The level at which hydrocolloids are incorporated in aqueous phase compositions is usually not very high either. Nevertheless, we have found that the use of commonly employed polysaccharide hydrocolloids in conventional amounts in aqueous phase compositions leads to the presence of amino acid residues in amounts well above 200 ppm calculated on the weight of the aqueous phase, and causes problems as described above. The amino acid residue content of conventional polysaccharide hydrocolloid preparations may range from less than 1 wt. % for e.g. celluloses to up to 10 wt. % for guar gum and locust bean gum preparations. Starch and starch hydrolysis products commonly contain about 1–2 wt. % amino acid residues. The amino acid residue content of a number of gum preparations has been published in "The Amino Acid Components of Some Commercial Gums", D. M. W. Anderson, Gums and Stabilisers for the Food Industry 3, p. 79–86, (1985), Elsevier Publishers. The following contents are given:

|  | % |
| --- | --- |
| Karaya | 1 |
| Arabic | 2 |
| Tragacanth | 2 |
| Guar | 3.5 |
| Xanthan | 5 |
| LBG | 5.5 |

This paper also adequately describes how the amino acid residue content of hydrocolloids and the like can be determined.

Thus, if the product of the present invention is to be prepared with the use of a polysaccharide hydrocolloid, care should be taken to evaluate the amino acid content of the hydrocolloid and, if necessary, to purify the hydrocolloid to ensure that the amino acid residue content in the aqueous phase composition will be sufficiently low.

DETAILED DESCRIPTION OF THE INVENTION

In this specification, ppm indicates parts per million. Thus, 200 ppm=0.02%. Unless indicated otherwise, all amounts in this specification, whether indicated in % or in ppm, are calculated on weight basis. The term amino acid residues includes intact and denatured protein, di- and oligopeptides and free amino acid groups. In practice, any amino acid residues present are likely to be present in the form of protein. However, if for example starch hydrolysis products are employed, then the protein originally present in the starch is hydrolyzed too during the hydrolysis, resulting in the formation of a corresponding amount of, for example, oligopeptides and amino acid groups. We have found oligopeptides and free amino acid groups to have similarly adverse effects as proteins themselves.

As described above, the amino acid residue content of the aqueous phase should be less than 200 ppm, or else problems will arise. This does not mean, however, that the aqueous phase composition should preferably comprise no amino acid residues at all. On the contrary, the presence of a small amount thereof may have a beneficial influence on the organoleptic properties of the product. We have found that incorporation of, in particular, about 5 to 10 ppm protein in the aqueous phase composition of a product having an aqueous phase containing, apart from water, preservative, vitamin, salt, acid and flavour components only, causes a significant change in the oral response. Trained evaluators found the product containing the protein to destabilize in the mouth more rapidly, and thereby to have an improved flavour release.

Thus, the present invention encompasses products without hydrocolloid. Such products would be rather bland but for the presence of a very small amount of protein in the aqueous phase. For example, the aqueous phase may comprise 5–10 ppm caseinate. Protein, in this context, includes native and denatured protein, as well as hydrolyzed protein and protein that has been modified otherwise.

The term hydrocolloid is used in this specification as in ZFL 32 (1981) 6, pages 253–256. Except for gelatin, which is a protein, all hydrocolloids are polysaccharides. Since gelatin is a protein causing essentially the same problems as other proteins, it should not be used in amounts such that the total amino acid residue content of the aqueous phase becomes higher than 100 ppm.

The viscosity at a temperature of 35° C. and a shear rate of 1000 s$^{-1}$ of the composition that is used as aqueous phase composition to prepare the product, is related to the consistency of the resulting product as perceived in the mouth. The viscosity at a temperature of 35° C. and and a shear rate of 1000 s$^{31\ 1}$ of the composition constituting the aqueous phase of the dispersions according to the invention may properly be determined by measuring the viscosity of the composition that is used as aqueous phase composition. The viscosity of the composition constituting the aqueous phase of the present dispersions is suitably measured by making up freshly a sample of said composition at 70° C., subsequently loading it on the plate of a Ferranti-Shirley viscometer ®, having a temperature of 35° C., and measuring the viscosity as soon as the sample has reached the target temperature of 35° C.

If the viscosity of the composition constituting the aqueous phase thus measured is high, then the resulting product will be perceived by trained evaluators as being thick in the mouth. Mostly, the reverse is true as well: Products that are considered to be thick in the mouth usually contain an aqueous phase of which the composition has a high viscosity when measured at 35° C. and 1000 $s^{-1}$ after having been freshly prepared at 70° C.

However, an exception occurs in case a slow-gelling hydrocolloid is used, then the viscosity measurement made of a freshly prepared sample may still indicate a low value, whereas the resulting product that may, for example, have been stored in the refrigerator for several days, may be thick in the mouth. However, this feature is easily recognized. The gelling rate of gelling agents is well known. An example of a slow-gelling agent is gelling hydrolyzed starch. Thus, when a slow-gelling hydrocolloid is used, the viscosity measured as indicated above may be fairly low, whereas the resulting spread is rather thick. In such cases, a product that is considered to be less thick can be easily made by simply reducing the amount of slow-gelling hydrocolloid in the aqueous phase composition.

When developing a new product., however, as a first selection criteron the viscosity at 35 degrees centigrades and 1000 S-1 carried out on a sample freshly prepared at 70 degrees centigrades, is very useful because the measurement is easy and can be carried out very rapidly.

A reliable impression of the consistency of the resulting product as perceived in the mouth, both in case a slow or a quick gelling agent is used, may be obtained by measuring the viscosity of the total product and 35 degrees centrigrades and 200 S-1. The products according to the invention, when having been stored in the refrigerator for 1 week after the preparation thereof, preferably have a viscosity at a temperature of 35 degrees centrigrades and a shear rate of 200 S-1 of less than 500 CPS. More preferably, the viscosity as measured under these conditions is below 400 CPS. The viscosity of the total product may suitably be measured by means of a Haake Viscometer ®.

The composition of the aqueous phase is preferably chosen so that it has a viscosity at a temperature of 35° C. and 1000 $s^{-1}$ of less than 200 cps. The composition constituting the aqueous phase more preferably has a viscosity at 35° C. and 1000 $s^{-1}$ of less than 100 cps, even more preferably of less than 80 cps. The lower limit of the viscosity at 35° C. and 1000 $s^{-1}$ of the aqueous phase composition is not critical. In practice the viscosity at 35° C. and 1000 $s^{-1}$ will be at least about 1 cps.

Severe problems often occur if the amino acid residue content of the aqueous phase is above 200 ppm. The ease of preparation often increases and the stability and other product properties frequently improve if the amino acid residue content of the aqueous phase is substantially lower than 200 ppm. On the other hand, the presence of some protein may be beneficial, as described above. The amino acid residue content of the dispersion is preferably less than 50 ppm, more preferably it is 1-20 ppm, calculated on the weight of the aqueous phase.

The present dispersion preferably comprises a hydrocolloid. The hydrocolloid may be a gelling or a thickening agent. The choice of hydrocolloid is, as such, not critical. For example, pectins, gellan, cellulose derivatives and mixtures of two or more thereof can suitably be employed. Preferably, the hydrocolloid employed is a hydrocolloid preparation having a low amino acid residue content. Alternatively, a hydrocolloid preparation having a higher amino acid residue content can be purified, prior to use in the spread preparation, to reduce the amino acid residue content to a sufficiently low level. Suitable hydrocolloids for use in the present dispersion, which can be obtained relatively easily in preparations having low amino acid residue contents, are agar agar and furcelleran. This applies also for carrageenan and alginate. Carrageenans, alginates and mixtures of two or more thereof, are particularly preferred hydrocolloids for use in the present dispersion. Preferably the dispersion according to the invention comprises more than 0.01 wt. % of hydrocolloid, calculated on the weight of the aqueous phase.

The present dispersion comprises a continuous fat phase. As is common practice with respect to edible plastified dispersions, the "continuous fat phase" includes the liquid oil forming a continuous phase as well as the solid fat particles contained therein, which have been phase-separated from the liquid oil by the plastification treatment.

The fat content of the dispersion preferably is 15-25% by weight. Most or all of the fat contained in the dispersion will normally constitute the continuous fat phase. Some of the fat may, however, be present in the form of globules dispersed in the aqueous phase.

Throughout this specification the terms oil and fat are used interchangeably. They are meant to include triglycerides such as soybean oil, sunflower oil, palm oil, fish oil, rapeseed oil, coconut oil, chemically and/or physically modified products such as hydrogenated, fractionated and/or interesterified triglyceride mixtures and mixtures of two or more thereof, as well as edible substances that are physically similar to triglycerides such as waxes and poly fatty acid esters of mono- or disaccharides, and that can be used as replacement for, or in admixture with, triglyceride oil.

Preferably, the fat contained in the present spreads consists essentially of triglycerides.

The precise composition of the fat is not critical. The solid fat content at 20° C is suitably between 5 and 30% calculated on the weight of the fat, preferably between 5 and 20 wt. %. At 5° C. the solid fat content is suitably between 5 and 50 wt. %, preferably between 10 and 25 wt. %.

In view of the breakdown properties in the mouth, however, it is preferred that the dispersion contains less than 6% solid fat at 30° C. calculated on the weight of the fat. More preferably, it contains 0-3 wt. % solid fat at 35° C. calculated on the weight of the total fat content of the product. We have found that the organoleptic characteristics of the present spread can depend fairly strongly on the solid fat content at temperatures just below the temperature in the mouth.

The solid fat content can conveniently be determined by measuring at the relevant temperature, e.g. 30° C., the NMR N-value (e.g. N30) as described in Fette, Seifen, Anstrichmittel, 80 (1978), 180-186, which indicates the amount of fat present in the solid state, expressed in percentage of the weight of the fat, at that temperature.

To obtain a product with good spreadability and plasticity it is necessary that it has a continuous fat phase. Conventionally, in plastified dispersions such as margarine and 40% fat spreads, the aqueous phase is present in the form of droplets dispersed in the continuous fat phase. In the present product, however, all aqueous phase need not necessarily be in the dispersed state. Some or all of the aqueous phase may be present as a continuous phase. In such a case the resulting product is, thus, bicontinuous.

According to conventional terminology, "dispersed phase" indicates a phase consisting of discrete parts of that phase, fully surrounded by material of one or more other phases. A "continuous phase" is not composed of discrete parts, but essentially extends in various directions throughout the product. From microscopic pictures of bi- or tri-continuous systems it may appear as if one of the phases does not extend throughout the product, and is in fact a dispersed phase, albeit one of which the discrete parts have capricious shapes. However, usually such phases are continuous. The incorrect impression is caused by the fact that the microscopic picture merely gives an incomplete two-dimensional image of the three-dimensional reality.

If the product contains continuous aqueous phase, care should be taken to avoid contamination of the product with micro-organisms as much as possible, to obtain a product with a long shelf-life. Thus, the processing equipment following the pasteurization stage should be kept very clean. Furthermore, to reduce the risk of microbiological spoilage, it is desirable to include preservatives, e.g. potassium sorbate, and acid in the aqueous phase composition. Suitably, the amount of acid employed is such that the pH is not higher than about 5. To reduce the risk of microbiological deterioration further, the product is preferably stored at low temperature, suitably in a refrigerator at about 5° C.

Preferably, however, the aqueous phase of the present product is a dispersed phase. On the one hand, the dispersed droplets should preferably be not too small for organoleptic reasons, in particular the taste and flavour impression of the product. On the other hand, to obtain excellent microbiological stability and spreading characteristics, the dispersed aqueous phase droplets should preferably not be too large. The volume weighted mean droplet diameter is preferably less than 30 $\mu$, more preferably less than 25 $\mu$. In view of the organoleptic properties of the present product, it is preferred that the number weighted mean droplet diameter is at least 5 $\mu$m. The number weighted mean diameter can suitably be determined by means of NMR (see J. Colloid and Interface Science (1972), 10, 206, and (1983), 93, 521), using a log-normal distribution as is commonly employed for particle size analysis.

The present product can be prepared relatively easily using conventional equipment, using for example surface-scraped heat exchangers, e.g. one or more A-units and/or stirred crystallizers, e.g. one or more C-units, optionally provided with cooling jackets, or using other equipment. There is no need to use high levels of emulsifier or high-melting fat blends.

Products with a dispersed aqueous phase having the above-indicated drop size can be obtained relatively easily. The presence of protein and/or hydrocolloid in the aqueous phase composition promotes formation of droplets somewhat larger than would be obtained in the absence of such ingredients. Thus, formation of a too fine dispersion is easily avoided. In particular, protein has a strong influence in this respect. One of the problems encountered, for example, if the protein content of the aqueous phase exceeds 200 ppm is that the dispersion tends to become very coarse. This is reflected in less good spreadability and an increased risk of microbiological spoilage. A good indication of expected microbiological keepability can, for example, be obtained by conductivity measurements. The conductivity tends to increase sharply if the protein content of the aqueous phase is raised to 200 ppm or more.

Thus, the protein and/or hydrocolloid contained in the aqueous phase composition of the present product facilitates obtaining sufficiently large droplets. On the other hand, the upper limit on the viscosity of the aqueous phase helps avoiding that the dispersion becomes too coarse. A highly viscous aqueous phase composition would make it more difficult to get the aqueous phase dispersed in the desired fine state. The viscosity of the aqueous phase composition at 35° C. and 1000 s$^{31}$1 measured on a sample freshly prepared at 70° C. is a relevant measure in this respect (whether or not the composition contains a slow-gelling hydrocolloid), because in practice the emulsifying and plastification treatment, at which stage the viscosity of the aqueous phase composition is relevant for the fineness of the dispersion obtained, is usually carried out immediately following the pasteurization.

Preferably, hydrocolloid is incorporated that comprises gelling agent in a concentration sufficient to cause the aqueous phase to gel. In particular, if the volume weighted mean diameter of the aqueous phase is larger than about 8$\mu$, it is preferred that the aqueous phase is gelled. This contributes to the physical stability of the product. In particular, it helps to avoid that the product would release moisture when subjected to shearing conditions, for example when it is spread.

The degree of dispersion of the aqueous phase can furthermore be controlled by adjusting the process conditions, in particular by varying the applied shear during the process, e.g. by varying the rotor speed of A- or C-units.

The volume weighted mean diameter of the aqueous phase can suitably be determined by means of NMR. See J. Colloid and Interface Science (1972), 40, 206, and (1983), 93, 521. Suitably, a log-normal distribution, commonly used for particle size analysis, is employed.

Alternatively, an estimate of the dispersed droplet size which for practical purposes usually is adequate, can conveniently be obtained from a photomicrograph of the product.

Except as indicated above, the composition of the aqueous phase is not critical. For example, the aqueous phase may include, apart from water, hydrocolloid and/or protein, ingredients such as are commonly incorporated in the aqueous phase of spreads, for example food acid, salt, preservative, flavour, vitamins etc. However, the present invention aims at providing an edible spread with a very low caloric value. To this end, it is preferred for the aqueous phase to consist mainly of water. The composition constituting the aqueous phase preferably contains at least 80 wt. % water, more preferably at least 90 wt. % water; a water content of 95–99.9 wt. % is particularly preferred.

The optimal amount of hydrocolloid to be employed depends in particular on the type of hydrocolloid. It can easily be determined by a few tests using a range of concentrations. For example, for hydrocolloids such as kappa- or iota-carrageenan, an amount of 0.1–1.5 wt. % will be adequate. Of such hydrocolloids, preferably about 0.4–1% by weight of the aqueous phase is employed.

The present dispersion can be prepared without the need to use high amounts of emulsifier. High levels of emulsifier usually have an adverse effect on the organoleptic properties of the product. For stability reasons, however, preferably some emulsifier is included.

The amount of emulsifier that can be used without adversely affecting the organoleptic properties of the dispersion depends on the type of emulsifier employed. In practice, it is preferred that the dispersion should contain less than 2.0 wt. % emulsifier. More preferably, the emulsifier content of the product is 0.05 to 1.0 wt. %, 0.1 to 0.5 wt. % being particularly preferred.

Both for ease of preparation and in view of the influence on the organoleptic properties of the resulting dispersion, it is preferred to employ an emulsifier composition having a relatively low melting point.

The emulsifier preferably used comprises monoglycerides, in particular monoglycerides containing unsaturated fatty acid residues. A suitable emulsifier is, for example, a monoglyceride composition derived from partially hydrogenated sunflower oil.

The emulsifier can suitably be incorporated in the dispersion via the fat phase composition. The fat phase composition may further comprise, apart from fat and emulsifier, commonly used ingredients such as flavour components, colouring matter, vitamins, etc.

EXAMPLE 1

An edible plastified dispersion containing 19.7 wt. % fat and comprising 20 wt. % continuous fat phase and 80 wt. % dispersed aqueous phase was prepared using the following compositions:

Fat phase:
26% soybean oil hydrogenated to a slip melting point of 38° C.
17.3% randomly interesterified mixture of palm oil and palmkernel oil in a 2:3 ratio on weight basis
55.2% sunflower oil
1.5% Hymono 4404 ® (emulsifier composition consisting mainly of monoglycerides derived from sunflower oil and hydrogenated to an iodine value of 40. The slip melting point of the composition point is 47° C.)
0.0067% Flavour composition.

Aqueous phase:
0.4% kappa-carrageenan
1.8% sodium chloride
97.8% distilled water pH adjusted to 4.8 with lactic acid.

The kappa carrageenan employed contained 0.2% of amino acid residues. Consequently, the amino acid residue content of the aqueous phase composition was 8 ppm. Of a small sample of aqueous phase composition, freshly prepared at 70° C., the viscosity at 35° C. and 1000 s$^{-1}$ was measured with a Ferranti-Shirley viscometer as described above. The viscosity was 3 cps. A sample of the aqueous phase composition was stored at 5° C. It did not form a gel. The volume weighted mean diameter of the dispersed aqueous phase, as determined by NMR, was 5 μm.

The product was prepared on a laboratory scale by continuously feeding 1 part by weight of fat phase composition and 4 parts by weight of aqueous phase composition, each composition having been heated to 70° C., through a series of 2 stirred crystallizers (C-units), provided with a cooling jacket. The C-units were operated at a rotor speed of 1400 rpm. The jacket temperature of each of the C-units was about 9° C. The product left the second C-unit having a temperature of about 16° C. The product was filled into tubs and stored for 1 week in a refrigerator.

The amount of solid fat, expressed as percentage calculated on the weight of the fat, present in the product at 5°, 20° and 30° C. was measured by means of NMR (N5, N20 and N30 value, respectively). N5, N20 and N30 were 27, 8 and 2, respectively.

The product obtained was considered to be very good by trained evaluators. It was stable, did not release water when spread and had very favourable organoleptic properties and spreading characteristics.

EXAMPLE 2

Example 1 was repeated, except that an aqueous phase composition was used that contained additionally 0.2 wt. % of potassium sorbate and that contained tap water instead of distilled water. The kappa-carrageenan that was used, containing 0.07% amino acid residues, causes the aqueous phase composition to contain 3 ppm amino acid residues. The presence of the potassium sorbate caused the viscosity at 35° C. and 1000 s$^{-1}$ to increase to 6 cps. The resulting product was very satisfactory.

This experiment was repeated four times, wherein furthermore caseinate was included in the aqueous phase composition in amounts of 5, 10, 100 and 150 ppm (on aqueous phase), respectively. The incorporation of the caseinate did not cause a significant change in the viscosity. Each of the aqueous phase compositions formed a gel when a sample thereof was left to stand at ambient temperature.

Of the resulting products the conductivity was measured and the aqueous phase distribution was characterized by means of NMR. The results are shown in Table 1.

TABLE I

| Sample | Caseinate content (ppm) | Amino acid residue content (1) (ppm) | Conductivity at 10° C. (2) (μS/cm) | D(3,3) (3) (μ) |
|---|---|---|---|---|
| 2a | 0 | 3 | 0.003 | 6 |
| 2b | 5 | 8 | 0.04 | 7 |
| 2c | 10 | 13 | 0.07 | 8 |
| 2d | 100 | 103 | 277 | 25 |
| 2e | 150 | 153 | 296 | 27 |

(1) The amino acid residue content equals the sum of the added caseinate and the amino acid residues incorporated via the kappa-carrageenan.
(2) The conductivity is measured in μS/cm. S indicates Siemens. At low conductivity values, e.g. below about 0.1, the risk of microbiological deterioration occurring is small.
(3) D(3,3) indicates the volume weighted mean diameter as determined by NMR.

The drop size of the aqueous phase in samples 2d and 2e is rather large. The conductivity of samples 2d and 2e is very high, indicating an unacceptable risk that early microbiological spoilage will occur.

The spreadability of the samples was judged by trained evaluators. The samples 2a, 2b and 2c had good spreading behaviour. The spreadability of samples 2d and 2e was found to be poor, as they lost water on spreading.

EXAMPLE 3

Example 1 was repeated, except that an aqueous phase containing no kappa-carrageenan but, instead, including 20 ppm caseinate and further containing 0.2 wt. % potassium sorbate and containing tap water instead of distilled water, was employed. The viscosity of this aqueous phase composition at 35° C. and 1000 s$^{-1}$ was about 1 cps (i.e. essentially the same as that of pure water). A good product was obtained. Its conductivity was about 0.002 μS/cm. The volume weighted mean diameter of the dispersed aqueous phase was 6 μm.

Similar results were obtained when, instead of 20 ppm caseinate, 10 or 5 ppm caseinate was applied.

For comparison, the experiment was repeated using an aqueous phase containing no caseinate. An acceptable product was obtained. Upon comparison, trained evaluators considered the caseinate-containing products to have better organoleptic properties, in particular regarding the emulsion breakdown and the tast and flavour release, than the comparative product without caseinate.

EXAMPLE 4

Example 1 was repeated, but using an aqueous phase composition (sample 4a) comprising:
  1.0 wt. % kappa-carrageenan (amino acid residue content 0.07%)
  1.8 wt. % sodium chloride
  97.2 wt. % distilled water lactic acid to pH 4.8.

The experiment was repeated once more, but further comprising 0.2 wt. % potassium sorbate and using tap water instead of distilled water (sample 4b).

For comparison, the experiment was repeated with the following two aqueous phases:
Sample 4c:
  2.8 wt. % iota-carrageenan
  0.2 wt. % potassium sorbate
  0.02 wt. % lactic acid
  97 wt. % tap water.
Sample 4d:
  14.5 wt. % Paselli SA2 ® maltodextrin (hydrolyzed potato starch with DE=2)
  2.0 wt. % gelatin (270 bloom)
  1.8 wt. % sodium chloride
  0.2 wt. % potassium sorbate
  0.02 wt. % lactic acid
  81.4 wt. % tap water.

The amino acid residue content of the iota-carrageenan was 0.09 wt. %. The amino acid residue content of the Paselli SA2 ® was 0.3 wt. %.

The fat phase that was used for preparing samples 4c and 4d had the following composition:
  81.5 wt. % sunflower oil
  17.0 wt. % interesterified blend of a 1:1 mixture of a lower melting fraction of fully hydrogenated palmkernel oil and fully hydrogenated palm oil
  1.5 wt. % Hymono 4404 ®
  0.0067 wt. % flavour composition The fat blend used had an $N_{30}$ value of 4.

In view of the high viscosity of sample 4c and the high protein content of sample 4d, to facilitate obtaining a properly dispersed aqueous phase, these samples were produced on a production line wherein, compared with the process as described in Example 1, the first C-unit was replaced by a high-speed C-unit, operated at 5500 rpm.

The four products were evaluated after 1 week storage in a refrigerator. All four spreads were stable. They all had a gelled aqueous phase. Samples 4c and 4d were much thicker in the mouth than samples 4a and 4; sample 4b being held to be somewhat thicker by the trained evaluators than sample 4a. The majority of the evaluators preferred the consistency of samples 4a and 4b to those of samples 4c and 4d, sample 4a being preferred to sample 4b.

The volume weighted mean diameter for samples 4a and 4d was determined by NMR. The volume weighted mean diameter found for sample 4a was 6 μm: for sample 4d it was 48 μm.

The viscosity at 35° C. and 1000 $s^{-1}$ and the amino acid residue contents of the four aqueous phases are shown in Table II. Although the viscosity reading of sample 4d is low, the resulting product has a very thick consistency. In the product, after a few days' storage, both the gelatin and the Paselli have formed a gel. In the viscosity measurement neither is gelled. The Paselli has not yet gelled because it is a slow-gelling hydrocolloid. The gelatin is not gelled because the gel is formed at a temperature below 35° C.

Of samples 4a, 4c and 4d furthermore the "thickness" was measured using the following procedure. The product was taken from the refrigerator and a sample was put in a MV sensoring system profiled cup of a Haake viscometer ®. The sample was equilibrated at 30° C. for 10 minutes. The cup was then introduced into the viscometer and the sample was sheared at a shear rate of 200 $s^{-1}$. The temperature was raised at a rate of 1° C/min. while shearing of the sample was continued. The viscosity was measured once the temperature had reached 35° C. The "thickness" value is the viscosity at 35° C. and a shear rate of 200 $s^{-1}$, thus measured. The thickness thus determined correlates with the consistency perceived in the mouth. The results are shown in Table II. These experiments are in agreement with the opinion of the evaluators about the consistency of the products.

TABLE II

| Sample | Amino acid residue content (ppm) | Aqueous phase viscosity at 35° C., 1000 $s^{-1}$ (cps) | Thickness (cps) |
| --- | --- | --- | --- |
| 4a | 7 | 36 | 180 |
| 4b | 7 | 70 | — |
| 4c | 26 | 430 | 570 |
| 4d | 2.10$^4$ | 15* | 550 |

*before gelation

EXAMPLE 5

An edible plastified dispersion comprising 20% fat phase and 80% aqueous phase was prepared using the same fat phase composition as in Example 1. The following aqueous phase composition was used:
  97.8% deionized water
  1.8% sodium chloride
  0.2% potassium sorbate
  0.2% sodium alginate (Manucol DMB ®) lactic acid to pH 5.5

The sodium alginate contained 0.5 wt. % amino acid residues, thus the amino acid residue content of the aqueous phase composition was 10 ppm. The viscosity of the aqueous phase composition at 35° C. and 1000 $s^{-1}$ was 3 cps. When a sample of the aqueous phase composition was left to stand, it did not form a gel.

The process was carried out using a procedure similar to the one described in Example 1, except that the jacket temperature of each of the C-units was about 7° C., and the product left the second C-unit having a temperature of about 14° C. A suitable product was obtained.

EXAMPLE 6

Example 1 was repeated, but using an aqueous phase comprising:

1.5 wt. % kappa-carrageenan
1.0 wt. % sodium chloride
97.5 wt. % deionized water pH adjusted to 4.8 by the addition of lactic acid The amino acid residue content of the aqueous phase was 10 ppm. The gelled aqueous phase had a viscosity of 40 cps at 35° C. and 1000 $s^{-1}$. The volume weighted mean diameter of the dispersed aqueous phase was 10 μm.

The product obtained was evaluated by trained evaluators who considered it to have a good quality. It was stable and had good spreading characteristics.

The experiment was repeated, except that the sodium chloride content was increased to a level of 1.25 wt. %. Again the product obtained was of good quality.

EXAMPLE 7

Example 4a was repeated twice, with the exception that the aqueous phase additionally comprised 1 wt. %, respectively 4 wt. % of Paselli SA2 ® maltodextrin.

The products obtained were stable and comprised a gelled aqueous phase. The aqueous phase of the product containing 1 wt. % of Paselli had an amino acid residue content of 37 ppm, a viscosity at 35° C. and 1000 $s^{-1}$ of 85 cps, and a volume weighted mean diameter of 9 μm. The aqueous phase of the product comprising 4 wt. % of Paselli had an amino acid residue content of 127 ppm, a viscosity at 35° C. and 1000 $s^{-1}$ of 100 cps, and a volume weighted mean diameter of 11 μm. The product comprising 1 wt. %, on the aqueous phase, of Paselli, had a good quality and spreadability. The product comprising 4 wt. %, on the aqueous phase, of Paselli, however, was of lower quality.

EXAMPLE 8

Example 2 was repeated, using different levels of sodium caseinate, i.e. levels of 0, 80 and 100 ppm.

The product comprising no caseinate was stable and had a good quality. The other products were of a rather poor quality, and tended to lose water on spreading. The volume weighted diameter of the products appeared to increase with the caseinate level. The values found were: 5, 27 and 27 μm.

EXAMPLE 9

Example 2 was repeated thrice, but with Hymono 4404 emulsifier added at respective concentrations levels of 0.5, 1.5 and 2.5 wt. %, calculated on the fat phase.

The products obtained all had a very good spreadability. The volume weighted mean diameter appeared to decrease with increasing emulsifier content. The values found were: 8.5, 5.3 and 4.5 μm.

EXAMPLE 10

Example 2 was repeated, but using Hymono 7804, having a slip melting point of 44° C., at a concentration level of 1.5 wt. % on fat. A good, stable product was obtained.

EXAMPLE 11

Using the process as described in Example 1, a spread comprising 20 wt. % continuous fat phase and 80 wt. % dispersed aqueous phase was prepared from a fat phase and aqueous phase as described below:

Fat phase
26% soybean oil hydrogenated to a slip melting point 38° C.
17.3% randomly interesterified mixture of Malaysian palm oil and palmkernel oil in a 2:3 ratio
2.5% palm oil hardened to a slip melting point of 58° C.
52.6% sunflower oil
1.5% Hymono 4404 ®
0.1% beta-carotene Aqueous phase
0.4% kappa-carrageenan
1.8% sodium chloride
0.2% potassium sorbate
97.4% tap water pH adjusted to 4.8 with lactic acid The kappa-carrageenan employed contained 0.14% of amino acid residues. Consequently, the amino acid residue content of the aqueous phase composition was 6 ppm. The viscosity of the aqueous phase composition at 35° C. and 1000 $s^{-1}$ was 6 cps.

The amount of solid fat, expressed as percentage calculated on the weight of the fat, present in the product at 5° and 30° C., was found to be 26.8% at 5° C., and 4.6% at 30° C.

The product obtained was considered to be good. It did not release water on spreading, and had good spreading characteristics.

EXAMPLE 12

A spread comprising 20 wt. % continuous fat phase and 80 wt. % dispersed aqueous phase was prepared from a fat phase and aqueous phase as described below:

Fat phase
49% soybean oil
12.9% coconut oil
16.8% soybean oil hardened to a slip melting point of 41° C.
19.7% randomly interesterified mixture of coconut oil and soybean oil, hardened to a slip melting point of 41° C., in a 1:2 ratio on weight basis
1.5% Hymono 4404 ®
0.1% beta-carotene Aqueous phase
1.% kappa-carrageenan
1.8% sodium chloride
97.2% distilled water The kappa-carrageenan employed contained 0.14% of amino acid residues. Consequently, the amino acid residue content of the aqueous phase composition was 14 ppm. The aqueous phase composition had a viscosity at 35° C. and a shear rate of 1000 $s^{-1}$ of 36 cps.

The amount of solid fat, expressed as percentage calculated on the weight of the fat, present in the product at 5° and 30° C., was found to be 38% at 5° C., and 5% at 30° C.

The product was prepared on a laboratory scale by continuously feeding 1 part by weight of fat phase composition and 4 parts by weight of aqueous phase composition, each composition having been heated to 70° C., through a series of 3 stirred C-units, provided with a cooling jacket. The first C-unit was operated at a rotor speed of 2000 rpm, the last two C-units at a rotor speed of 1500 rpm. The exit-temperature of the water-and-oil mixture after each C-unit was 15° C.

The product obtained was considered to have a good quality. It did not release water on spreading, and had good spreading characteristics.

EXAMPLE 13

Example 12 was repeated, except that the fat phase comprised 1.5% Hymono 7804® instead of Hymono 4404®.

A good spread was obtained, which did not release water on spreading.

We claim:

1. An edible plastified dispersion having a fat content of less than 30% by weight and comprising a continuous fat phase and a dispersed aqueous phase, wherein the aqueous phase includes an ingredient selected from the group consisting of protein, polysaccharide hydrocolloids and mixtures thereof, wherein the aqueous phase has a viscosity of less than 200 cps (200 mPa.s) at a temperature of 35° C. and shear rate of 1000 $s^{-1}$, and wherein the content of amino acid residues is less than 100 ppm calculated on the weight of the aqueous phase.

2. Dispersion according to claim 1, wherein the aqueous phase has a viscosity of less than 100 cps at 35° C. and 1000 $s^{-1}$.

3. Dispersion according to claim 2, wherein the aqueous phase has a viscosity of 1–80 cps at 35° C. and 1000 $s^{-1}$.

4. Dispersion according to claim 1, wherein the aqueous phase contains a hydrocolloid selected from the group consisting of carrageenan, alginate, and mixtures thereof.

5. Dispersion according to claim 4, wherein the content of hydrocolloid is more than 0.01 wt. % calculated on the weight of the aqueous phase.

6. Dispersion according to claim 1, having a fat content of 15–25% by weight.

7. Dispersion according to claim 1, wherein the aqueous phase is a dispersed phase, having an average droplet size, indicated by the number weighted mean diameter, of more than 5 μm.

8. Dispersion according to claim 1, wherein the aqueous phase is gelled.

9. Dispersion according to claim 1, comprising solid fat wherein the dispersion comprise less than 6% of said solid fat at 30° C. calculated on the weight of the fat.

10. Dispersion according to claim 1, further comprising 0.1–0.5% by weight of an emulsifier.

* * * * *

UNITED STATES PATENT AND TRADEMARK OFFICE
CERTIFICATE OF CORRECTION

PATENT NO. : 5,451,422
DATED : September 19, 1995
INVENTOR(S) : Cain et al.

It is certified that error appears in the above-indentified patent and that said Letters Patent is hereby corrected as shown below:

Claim 1, line 8 wherein "$1000_s31\ 1$" should have read —$1000_s-1$,—
Column 15, line 18    Title page, item [73], Assignee:
"Lever Brothers Company, Division of Conopco, Inc., New York, N.Y." should be —Van den Bergh Foods Co., Division of Conopco, Inc., New York, N.Y.—.

Signed and Sealed this

Sixth Day of February, 1996

Attest:

BRUCE LEHMAN

*Attesting Officer*   *Commissioner of Patents and Trademarks*